United States Patent
Hasegawa et al.

(10) Patent No.: US 7,241,994 B2
(45) Date of Patent: Jul. 10, 2007

(54) SCANNING PROBE MICROSCOPE AND SPECIMEN SURFACE STRUCTURE MEASURING METHOD

(75) Inventors: Tsuyoshi Hasegawa, Wako (JP); Masakazu Aono, Wako (JP); Tomonobu Nakayama, Wako (JP); Sumio Hosaka, Kiryu (JP)

(73) Assignee: Riken, Saitama (JP)

( * ) Notice: Subject to any disclaimer, the term of this patent is extended or adjusted under 35 U.S.C. 154(b) by 0 days.

(21) Appl. No.: 10/503,701

(22) PCT Filed: Feb. 5, 2003

(86) PCT No.: PCT/JP03/01168

§ 371 (c)(1),
(2), (4) Date: Jun. 27, 2005

(87) PCT Pub. No.: WO03/067224

PCT Pub. Date: Aug. 14, 2003

(65) Prior Publication Data

US 2005/0242283 A1    Nov. 3, 2005

(30) Foreign Application Priority Data

Feb. 5, 2002    (JP) .............................. 2002-028046

(51) Int. Cl.
*G01N 13/16* (2006.01)
*G01B 5/28* (2006.01)
*G01B 7/34* (2006.01)

(52) U.S. Cl. ...................... 250/310; 250/306; 250/307; 73/105

(58) Field of Classification Search ..................... None
See application file for complete search history.

(56) References Cited

U.S. PATENT DOCUMENTS

| | | | |
|---|---|---|---|
| 4,902,892 A | 2/1990 | Okayama et al. | ........... 250/307 |
| 5,162,653 A | 11/1992 | Hosaka et al. | ............... 250/306 |
| 5,262,643 A * | 11/1993 | Hammond et al. | ......... 250/306 |

(Continued)

FOREIGN PATENT DOCUMENTS

| | | |
|---|---|---|
| JP | 9152436 | 6/1997 |
| JP | 0028511 | 1/2000 |

(Continued)

OTHER PUBLICATIONS

Kado et al. (1993) "Observation of contact holes by atomic force microscopy with ZnO whIsker tip", J. Appl. Phys. 74: 4354-4356.

*Primary Examiner*—Nikita Wells
(74) *Attorney, Agent, or Firm*—Baker Botts L.L.P.

(57) ABSTRACT

A digital probing type atomic force microscope (AFM) for measuring high aspect structures with high precision. A probe 21 is vibrated while moved to the vicinity of an atomic force region on a specimen surface. The position of the probe is measured when a specified atomic force is detected in the atomic force region. The probe is then moved away from the specimen surface. A servo system for maintaining a gap between the probe and specimen surface is stopped. The probe is moved to a measurement point along the specimen surface while kept away from the specimen. The vibration frequency is a frequency slightly offset from the cantilever resonance point. The atomic force is detected based on the vibration amplitude of the cantilever.

7 Claims, 8 Drawing Sheets

U.S. PATENT DOCUMENTS

| | | | |
|---|---|---|---|
| 5,436,448 A | 7/1995 | Hosaka et al. | 250/306 |
| 6,073,485 A | 6/2000 | Kitamura | 73/105 |
| 6,079,254 A * | 6/2000 | Chen et al. | 73/105 |
| 6,666,075 B2 * | 12/2003 | Mancevski et al. | 73/105 |

FOREIGN PATENT DOCUMENTS

| | | |
|---|---|---|
| JP | 0321292 | 11/2000 |
| JP | 01108602 | 4/2001 |

* cited by examiner

Perpendicular component of friction force : $\eta F\cos\theta\sin\theta$

Perpendicular component $F_z$ of force onto probe $= F\cos^2\theta + \eta F\cos\theta\sin\theta$
$\quad \doteqdot F\cos^2\theta$ ($F_c = F_z$: Force setting during fixed atomic force)

SCANNING PROBE MICROSCOPE AND SPECIMEN SURFACE STRUCTURE MEASURING METHOD

CROSS REFERENCE TO RELATED APPLICATION(S)

The present application is a U.S. national stage application of International Patent Application No. PCT/JP03/01168, filed Feb. 5, 2003, published in Japanese on Aug. 14, 2003 as PCT Publication No. WO 03/067224 A1, incorporated herein in its entirety. This application claims priority from the International Application pursuant to 35 U.S.C. § 365.

TECHNICAL FIELD

The present invention relates to a scanning probe microscope capable of making three-dimensional measurements on the nanometer order of accuracy on the surface structure of a specimen, and relates in particular to a probe microscope capable of accurate measurements of a surface structure with a fine structure on the nanometer level, and further possessing a high aspect ratio.

BACKGROUND ART

In recent years, along with the growth of our information society, there are increasing needs for technology capable of joint use of large amounts of information. The semiconductor field is making progress in miniaturization. Current leading edge technology is seeking to miniaturize devices to a minimum scale of 0.13 μm. Along with this progress, there is also a need for higher precision and greater miniaturization in device isolation technology, wiring technology and contact technology, etc. Structures with a higher aspect ratio (depth/aperture diameter) are also being proposed and technology to fabricate these structures is being sought. Besides fabrication technology, advances in measurement technology are also needed. In particular, development of methods for measuring precision on the nanometer scale are needed. More specifically, according to the semiconductor road map for the future, the current minimum hole diameter of 180 nanometers will shrink to 60 nanometers by the year 2010. Also, aspect ratios will increase from 7 to 12 so measurement down to these dimensions will also become increasingly difficult. Current technology uses the scanning electron microscope (SEM), to observe a cross-section of the specimen after splitting it open or machining it with a focusing ion beam (FIB) technology.

These types of methods using probe microscopes to measure surface structures with high aspect ratios include a method (U.S. Pat. No. 2,936,545) for discrete scanning of the specimen in a state where the probe is separated from the specimen, and the probe is moved to a measurement point in proximity to the specimen to measure the surface position. In this method, during scanning of the surface, the gap between the specimen and probe when making an actual physical measurement is larger than necessary and the probe moves at high speed to the next pixel; and when making surface measurements, the scanning is stopped, and the probe is moved in proximity to the specimen and measures the surface position.

Measurements of a specimen surfaces with a large aspect ratio and small aperture diameter require attaching an extremely slim probe as a tip of the cantilever. The elasticity (spring constant) of the probe is therefore poor horizontally and is nearly the same spring constant as the cantilever. The probe therefore warps or deforms on reaching the oblique surface (of the specimen).

Figure 10:
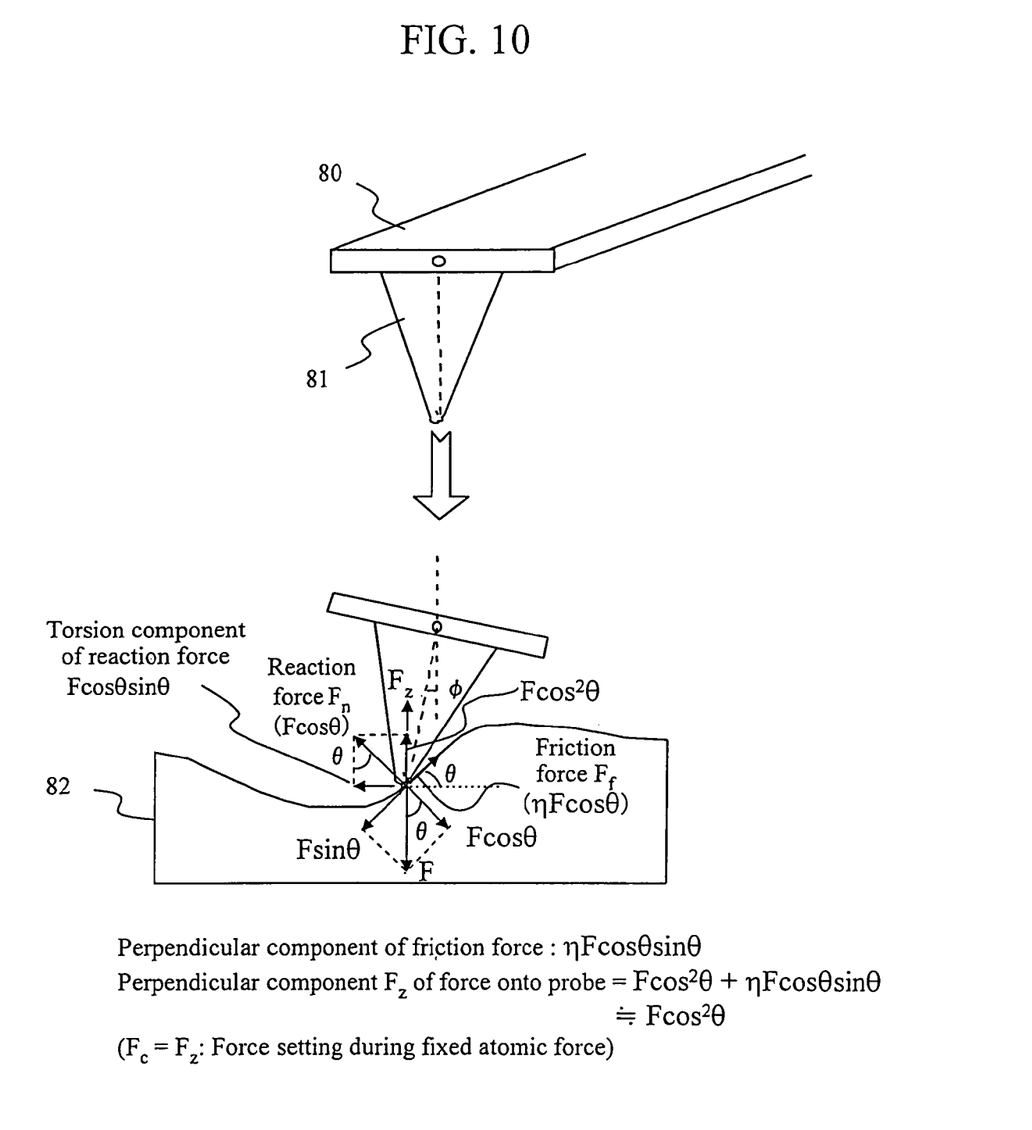
FIG. 10 is a drawing describing the force acting on the probe and the probe torsion when the probe has approached the oblique surface.

In atomic force microscopes (AFM) of the conventional art with contact type digital probing, the probe at the pixel position, repeatedly moves close to the specimen surface and then back. When the probe captures the specimen surface while nearing it, and when the oblique surface is steep, the cantilever 80 and probe 81 are twisted as shown in FIG. 10, and an error appears in the position measurement on the surface of the specimen 82. The measurement position error Δr (surface interior) and Δz (perpendicular direction) are expressed as follows due to the warping of the probe.

$$\Delta r = F_c \tan \theta / k (k = El/(5\gamma_a^3), \gamma_a = l/t) \quad (1)$$

$$\Delta z = \Delta r \tan \theta \quad (2)$$

$$F_c = F \cos^2\theta \quad (3)$$

Here, $F_c$ is the fixed atomic force, θ is the angle the oblique surface tilts from perpendicular relative to the probe, k is the spring constant of the probe, E is the Young's modulus of the probe, l is the probe length, and t is the probe thickness. The $\gamma_a$ is here called the probe aspect ratio. The probe aspect ratio holds roughly the same significance as the specimen aspect ratio. This type of measurement cannot be performed unless the probe aspect ratio is higher than the specimen aspect ratio.

In contact type methods for detecting atomic force such as the light deflection method, the force setting is approximately $10^{-8}$N. For example, when the atomic force $F_c$ setting is $10^{-8}$N, the angle θ is 45 degrees, the Young's modulus E of the probe is $2\times10^{11}$N/cm$^2$, the probe length l is 1 μm, and the probe thickness is 50 nanometers ($\gamma_a$=20), then the Δr and the Δz are 2 nanometers. When the angle θ is 80 degrees, then the Δr is 11 nanometers and the Δz is 64 nanometers. Further, when the angle θ is 85 degrees, the Δr is 23 nanometers, the Δz is 261 nanometers, it can be seen that the probe tip will slip on the specimen surface. This slippage shows that the technology of the conventional art is not capable of accurately measuring the shape of surface structures having a high aspect ratio.

In view of the problems with the conventional art, the present invention has the object of providing a scanning probe microscope capable of accurately measuring surface structures with high aspect ratio, and a method for measuring surface structures of specimens having a high aspect ratio.

DISCLOSURE OF THE INVENTION

As can be seen from equations (1) and (2), lowering the atomic force Fc by regulating it to a fixed quantity with the servo will prove effective in reducing the measurement position errors Δr and Δz. In other words, it is important that a small atomic force be used to control the system. The conventional art utilized the atomic force of the repulsive force region to accomplish this. However, the minimum atomic force is approximately $10^{-8}$N so achieving a measurement position error of 1 nanometer or less, requires setting an atomic force regulated to $10^{-10}$N or less.

In order to regulate the atomic force to $10^{-10}$N or less, the present invention employs the vibration type force detection method. In other words, the present invention uses a non-contact force detection method. In this method, the cantilever supporting the probe is oscillated at its resonance point, and the shift occurring in the resonance point (resonance frequency) due to an externally applied force is measured. There are two types of non-contact force detection methods. One type (FM modulation type) detects the weak force acting on the probe by oscillating the cantilever supporting the probe at its resonance point and measuring the shift in the resonance point due to an externally applied force. The other type (slope detection method) oscillates the cantilever at a frequency slightly shifted from its resonance point, and measures the minuscule atomic force by measuring the change in amplitude resulting from the externally applied force. The atomic force in the attraction force region is detected by utilizing these methods. An atomic force of around $10^{-13}$N can be detected by these methods. Further, a probe position error of 1 nanometer or less can be attained even with a slope of 85 degrees or more on the specimen cross section so that shapes with an aspect ratio of 10 or more can be measured with accuracy on the sub-nanometer level. High aspect probes such as carbon nanotubes can also be used as probes in this invention.

The scanning probe microscope of the present invention is in other words, characterized in comprising: a specimen stage for mounting the specimen, a probe, a cantilever for supporting the probe, a first probe movement means for moving the probe two-dimensionally along the surface of the specimen, a second probe movement means for moving the probe closer to or farther away from the specimen surface, a probe position detection means for detecting the probe position, a means to oscillate the cantilever at a specified frequency shifted slightly from the cantilever resonance point, an amplitude detection means to detect the oscillation amplitude of the specified frequency component of the cantilever, and a control means to detect changes in the vibration amplitude while moving the cantilever closer to the specimen surface and measure the probe position when the change in the vibration amplitude has reached a specified quantity. The amplitude detection means is comprised of a lock-in amplifier.

The scanning probe microscope of the present invention is further characterized in comprising: a specimen stage for mounting the specimen, a probe, a cantilever for supporting the probe, a first probe movement means for moving the probe two-dimensionally along the surface of the specimen, a second probe movement means for moving the probe closer to or farther away from the specimen surface, a probe position detection means for detecting the probe position, a means to oscillate the cantilever supporting the probe at that resonance point, a resonance frequency shift detection means to detect a shift in the resonance frequency of the cantilever, and a control means to detect a shift in the resonance frequency of the cantilever while moving the cantilever in a direction closer to the specimen surface, and measure the probe position when the shift in the resonance frequency reaches a specified quantity. The resonance frequency shift detection means may be comprised of a phase-locked-loop circuit.

The probe of the scanning probe microscope of the present invention may be comprised of carbon nanotube. The probe position detection means may utilize a capacity displacement meter a strain gauge, a light interferometer or an optical lever.

The specimen surface structure measuring method of the present invention for measuring the surface structure of the specimen utilizing the scanning probe microscope containing a cantilever supporting the probe, with this measuring method comprising: a step to stop the servo system maintaining a fixed gap between the probe and specimen and move the probe along the specimen surface to the measurement point with the probe separate from the specimen, a step to oscillate and move the probe close to the specimen surface and measure the probe position when a specified atomic force is detected in an attraction force region, and a step to move the prove away from the specimen surface immediately after the measurement, and the above steps are repeated at each measurement point. In the step to move the probe away from the specimen surface, the probe is lifted with a distance or more where there is no absorption force to attract the probe.

After the probe detects the specified atomic force, the probe is pulled back from the specimen immediately. However, the probe might sometimes strike the specimen surface due to a circuit delay, etc. The probe might then break and the measurement function disabled. To avoid probe breakage, the servo circuit (circuit to control the distance between the specimen and probe to attain the desired atomic force) preferably utilizes a distance control signal when moving the probe in proximity to the surface of the specimen. The probe should also preferably move towards the specimen at a constant speed. Using the servo circuit signal to avoid the probe striking the specimen for the probe approach to the surface is essential at this time.

More specifically, the probe vibration frequency is a frequency shifted slightly from the resonance point of the cantilever, and the specified atomic force is detected based on the change in the vibration amplitude of the cantilever.

As an alternative, the vibration frequency of the probe may be made the cantilever resonance point frequency and, the atomic force detected based on the shift in the cantilever resonance frequency.

The scanning probe microscope of the present invention may used for measurement of tiny devices or may be used to measure defects. This scanning probe microscope may also be used as a line monitor in the semiconductor manufacturing process. In the basic probe operation during measurement, when the scanning stops the surface position is measured, and during scanning the probe is separated from the specimen surface. The vibration method (non-contact) method is used simultaneous with probe operation at a force setting of $10^{-10}$N and below. Therefore, even with an aspect ratio of 10 or more, errors of 1 nanometer or less due to slip of the probe can be suppressed, and high precision shape measurement can be performed.

BEST MODE FOR CARRYING OUT THE INVENTION

The present invention is next described in detail while referring to the drawings. The digital probing AFM of the present invention possesses a system to detect the force gradient. In the following drawings, sections with the same functions are assigned identical reference numeral and their redundant description is omitted.

First Embodiment

Figure 1:
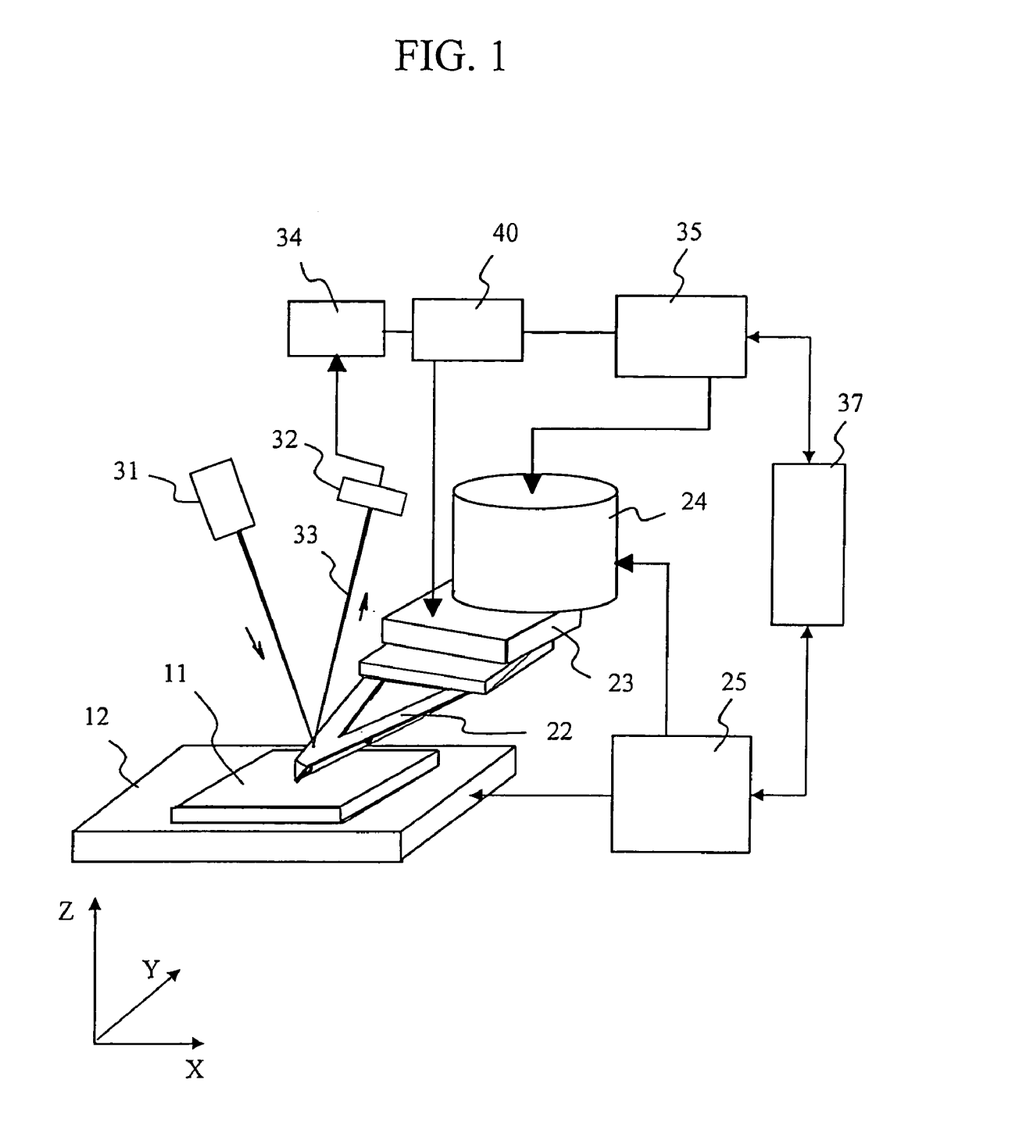
FIG. 1 is a block diagram showing an example of the digital probing AFM of the present invention using the slope detection method.

FIG. 1 is a block diagram showing an example of the digital probing AFM of the present invention using the slope detection method. In addition to the usual AFM structure, this digital probing AFM contains a vibration mechanism for detecting the atomic force gradient.

The specimen 11 is mounted on the XY specimen stage 12. The XY specimen stage 12 is moved coarsely by the XY scanning circuit 25 so that the measurement region is selected directly below the probe. The cantilever 22 with the probe is attached on an exciter piezoelectric element 23 and a cylindrical XYZ scanning piezoelectric element 24. A normal optical lever method made up of a semiconductor laser 31, a position detector 32, and a force detector 34 is utilized as the force detector. The servo circuit 35 drives the probe in the Z direction by means of the XYZ scanning piezoelectric element 24, and servo controls the force to a fixed value with the signal detected by force detector 34. The XY scanning circuit 25 performs XY scanning utilizing the XYZ scanning piezoelectric element 24 for drive of the probe in the XY directions along the specimen surface. Though not shown in the drawing, an approach is installed for making the probe approach or retract from the surface of the specimen 11 with a large stroke from Z movement of the XYZ scanning piezoelectric element 24. The present example utilizes a lock-in amplifier 40 for detecting the force gradient. The controller 37 controls the XY scanning circuit 24 and the servo circuit 35.

The probe preferably has a shape and slim shape as possible in view of the height and groove depth of the specimen 11. In particular probes with an aspect ratio of 10 or more are preferably fabricated using a carbon nanotube or carbon fiber, etc.

Figure 2:
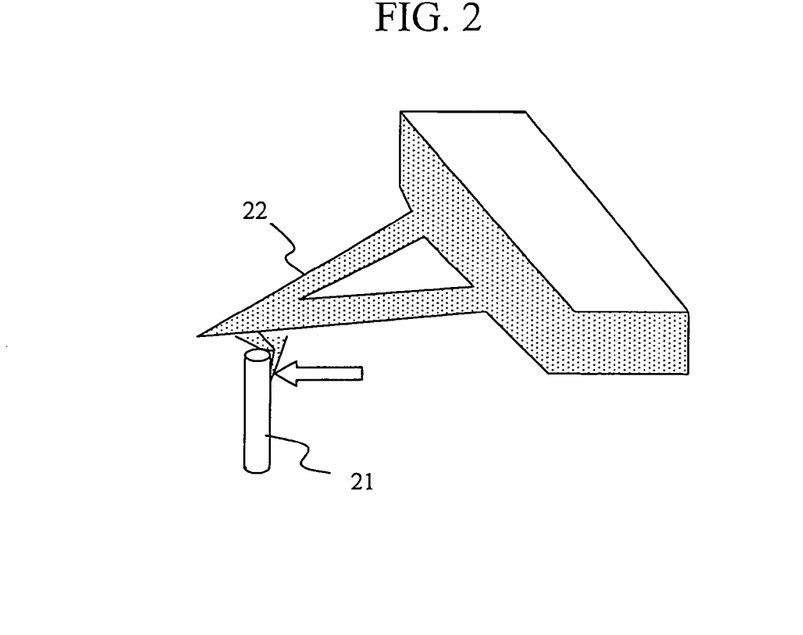
FIG. 2 is concept drawing showing an example of the probe of carbon nanotube.

FIG. 2 is concept drawing showing an example of the probe of carbon nanotube. A carbon nanotube forming the probe 21 is bonded to the tip of the cantilever 22 made from silicon film, silicon nitride film or silicon oxide film. The diameter of the carbon nanotube is preferably approximately 10 to 50 nanometers and the length is 500 nanometers or more. The carbon nanotube is attached to the cantilever 22 by adhering the carbon nanotube to the tip of the cantilever supporting to a manipulator not shown in the drawing. The electron beam is then irradiated onto the end section (arrow position in drawing) cantilever 22 side of the carbon nanotube, and the bonding (adhesion) is performed by means electron beam deposition of the carbon at that time.

Figure 3:
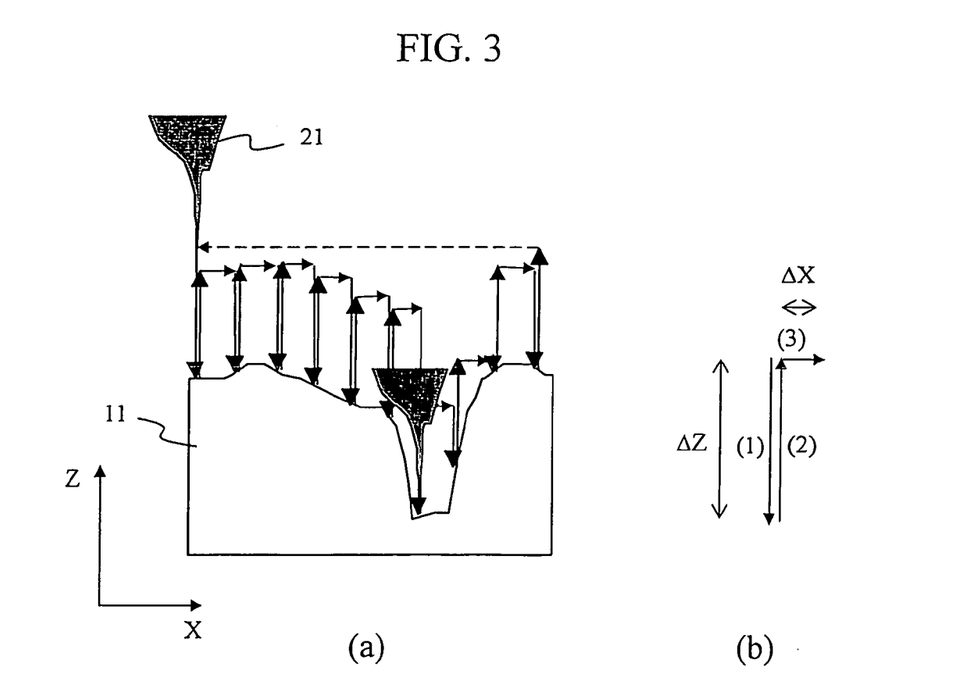
FIG. 3 is a drawing showing the movement of the probe during a measurement sequence in vibration type digital probing AFM.

FIG. 3 is a drawing showing the movement of the probe during the measurement sequence in vibration type digital probing AFM shown in FIG. 1. FIG. 3(a) is a drawing showing the repeated movement of the probe along the specimen surface. FIG. 3(b) is a drawing showing the fundamental movement of the probe for one pixel point.

The probe 21 is first of all driven approximately a few to a few hundred nanometers in the Z direction while vibrated by the XYZ scanning piezoelectric element 24 and is made to approach the surface of the specimen 11. An excitation signal is at this time output from the lock-in amplifier 40 or an external oscillator, and input to the exciter piezoelectric element 23. The vibration of the exciter piezoelectric element 23 then vibrates the probe 21. The vibration frequency is a frequency shifted slightly from the cantilever resonance point. When the preset atomic force gradient acts on the probe 21, the vibration amplitude changes, and matches the value that was set. This (match) is determined when the probe 21 reaches to the specimen 11. The driving of the probe 21 towards the vicinity of the specimen surface is stopped. The probe 21 is then lifted up in a pre-determined distance $\Delta Z$ to retract it from the specimen surface (2). This distance $\Delta Z$ is at least a distance where the specimen 11 has no absorption force on the probe 2, or is set as a distance larger than the predicted surface irregularities. Next, at the point retracted by a distance $\Delta Z$, the XY scanning circuit 25 next drives the XYZ scanning piezoelectric element 24 to move the probe only by $\Delta X$ in the X direction, and sets the probe 21 at the next pixel position (3).

The surface structure of the specimen 11 is measured by the repeated probe 21 movement comprised of the above (1) (2) (3) steps. When scanning along the X direction is complete, the probe moves just a specified distance $\Delta Y$ in the Y direction, and again scans in the X direction. The specimen surface can be measured three-dimensionally by repeating these movements.

Figure 4:
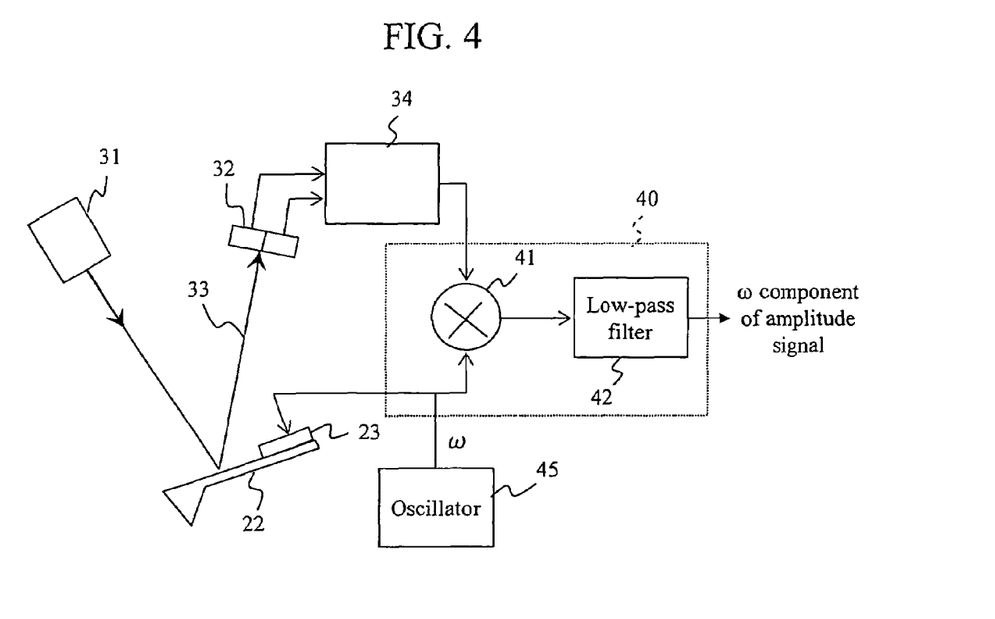
FIG. 4 is a concept block diagram of the lock-in amplifier.

The measurement of the atomic force gradient acting on the probe is described next utilizing the block diagram of the lock-in amplifier shown in FIG. 4. The high frequency signal output from the oscillator 45 is input to the exciter piezoelectric element 23 and the multiplier 41 of the lock-in amplifier 40. The cantilever 22 is driven at a frequency $\omega$ by the exciter piezoelectric element 23. A laser beam 33 emitted from the semiconductor laser 31 is reflected by the cantilever 22, and is detected by the position detector 32 made up of a dual-split or quad-split optical detector. The output from the force detector (laser position detector circuit) 34 is multiplied by the output from the oscillator 45 at multiplier 41 inside the lock-in amplifier 40. The amplitude of the frequency component output from the multiplier 41 via the low-pass filter 42, that is synchronized with the oscillator signal is then detected.

When the probe 21 approaches near the surface of the specimen 11, and the atomic force acts on the probe 21, the resonance point (frequency) of the cantilever 22 shifts. The lock-in amplifier 40 captures the shift in this resonance point as a change in amplitude of the probe 21 vibration. This amplitude change is detected as a fluctuation of the force gradient, and when the preset change in the force gradient is reached, the probe 21 is determined to have arrived at the surface of specimen 11. The controller 37 then measures the coordinates of the probe 21 at that time or in other words, measures the surface position coordinates (x, y, z).

Figure 5:
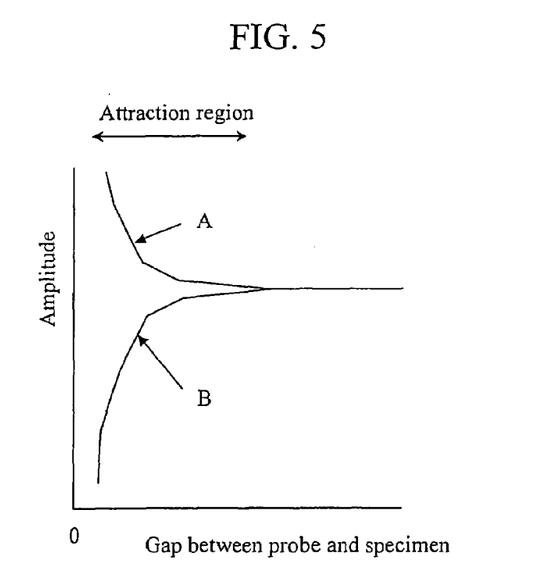
FIG. 5 is graph showing the relation of the detection amount from changes in amplitude by the lock-in amplifier and the distance between the specimen surface and the probe.

FIG. 5 is graph showing the relation of the amount detected as the change in amplitude by the lock-in amplifier and the distance between the specimen surface and probe. The horizontal axis is the gap between the probe and specimen. The vertical axis is the amplitude of the frequency $\omega$ component detected by the lock-in amplifier. The curve A expresses the change in amplitude when the excitation frequency $\omega$ was set to a frequency lower than the resonance frequency of probe 21. In this case, the amplitude of the frequency ω component increases when the probe 21 nears the specimen surface. In the case of curve B, the amplitude of the frequency ω component conversely decreases when the probe 21 nears the specimen surface. Therefore, by setting a threshold (value) for the amplitude change, the probe 21 can be decided to have reached the specimen surface when the detected change in amplitude has exceeded that threshold.

When the position of the specimen surface is detected by means of the force gradient acting on the probe 21, the XY scanning function is completely stopped by the XY scanning circuit 25. After measuring the probe coordinates, the probe 21 is promptly retracted from the specimen surface in the Z direction by a specified distance ΔZ. After retracting in the Z axis direction, the probe 21 next moves to the next pixel point by the XY scanning circuit 25 by distance ΔX. The probe 21 is then again moved near the specimen 11 by the same procedure, and detects the surface position. The surface position (x, y, z) of the specimen at each pixel, and acquires information on the surface structure of the specimen.

By driving the probe 21 in this way, the effects of friction due to scanning by continuous servo drive of the probe 2 can therefore be eliminated. The system can also be operated to detect an extremely small force, so errors due to the probe 21 slipping along a steep slope can be drastically reduced when moving the probe 21 in proximity to the specimen 11. The method of the present invention can therefore measure with good accuracy the high aspect structures that will be needed in the future. The retraction amount ΔZ of probe 21 should preferably be set larger than the height or depth of peaks or grooves on specimen 11, in view of the heights or depths of the surface structure of the specimen 11.

In the example shown in the drawing, an optical lever was utilized for detecting the displacement of the probe 21. However a capacity displacement meter, a strain gauge, or a light interferometer or similar device of the known art in measuring technology may also be utilized.

Second Embodiment

Figure 6:
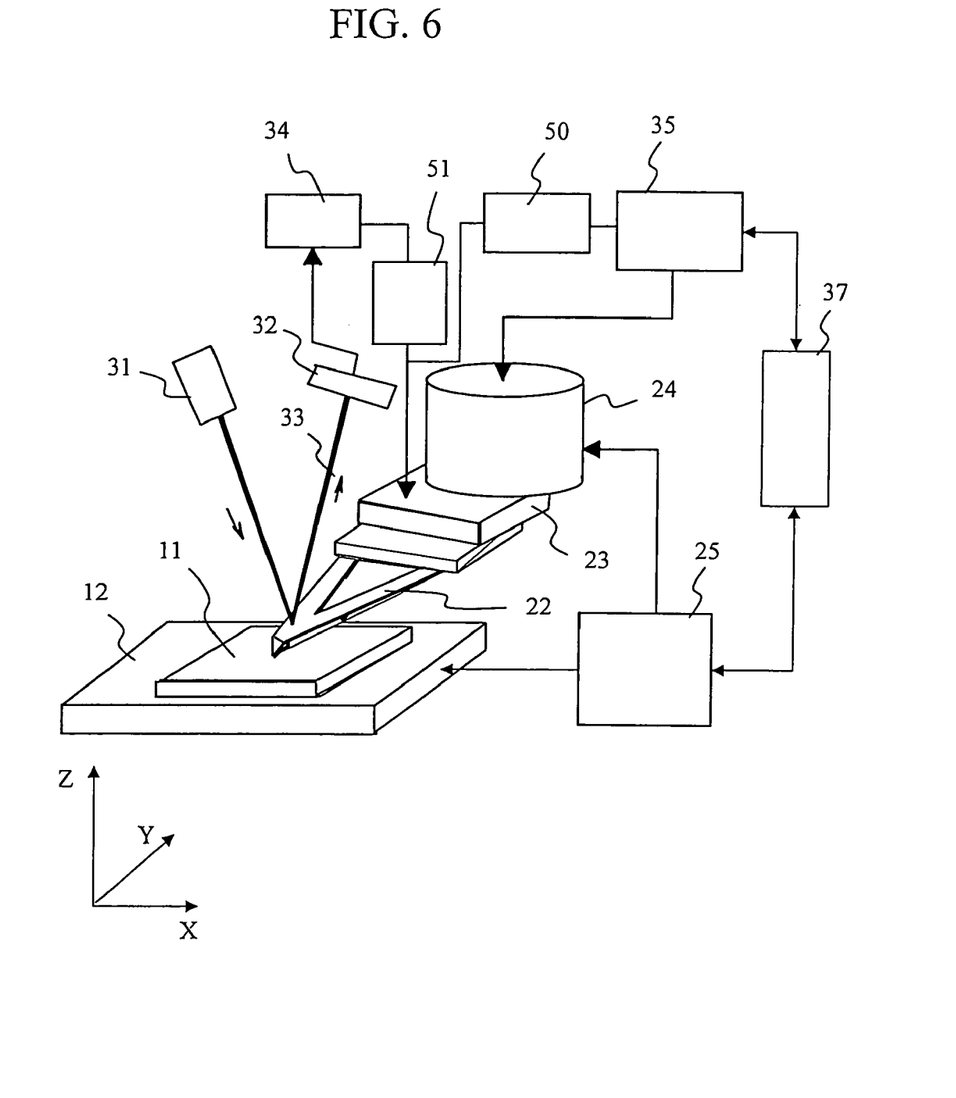
FIG. 6 is a concept block diagram of showing another example of digital probing AFM in the present invention.

FIG. 6 is a concept block diagram of showing another example of digital probing AFM in the present invention. In addition to the usual AFM structure, this digital probing AFM contains an FM (frequency modulation) detection type atomic force gradient detector.

In the example in the drawing, the force detector utilizes an optical lever system made up of a semiconductor laser 31, a position detector 32, a force detector circuit 34. However in order to detect the force gradient, the frequency is demodulated using a PLL (phase-lock-loop) circuit 50 and the change in the force gradient detected from the change in the frequency. The servo system, scanning system, proximity mechanism, and probe position detector identical to the first embodiment are utilized to regulate the detected signal to a fixed value. Unlike the first embodiment, an external oscillator (or vibrator) is not used for self-vibrating the probe, instead a resonance circuit system in the internal circuit network is utilized. In other words, the closed loop formed by the probe, exciter piezoelectric element 23, oscillator circuit 51, force detector 34 and optical lever probe position detector 32 is made to function as a positive feedback coupling to make the cantilever 22 oscillate (vibrate) at the resonance point.

The measurement procedure is the same as the first embodiment. First of all, a closed loop is formed by the probe, exciter piezoelectric element 23, oscillator circuit 51, force detector 34 and light deflection probe position detector 32. These components form a positive feedback coupling to make the cantilever 22 oscillate (vibrate) at the resonance point. The probe is made to approach near the specimen surface while being vibrated. When the preset atomic force gradient acts on the probe, the probe is determined to have made an approach near the specimen surface. The surface position information is then acquired and the probe afterwards retracted from the specimen surface to a specified distance ΔZ. At the Z position where the probe was retracted, the probe is moved in the X direction to the next pixel position, and the operation for surface position measurement is repeated in the same way.

Figure 7:
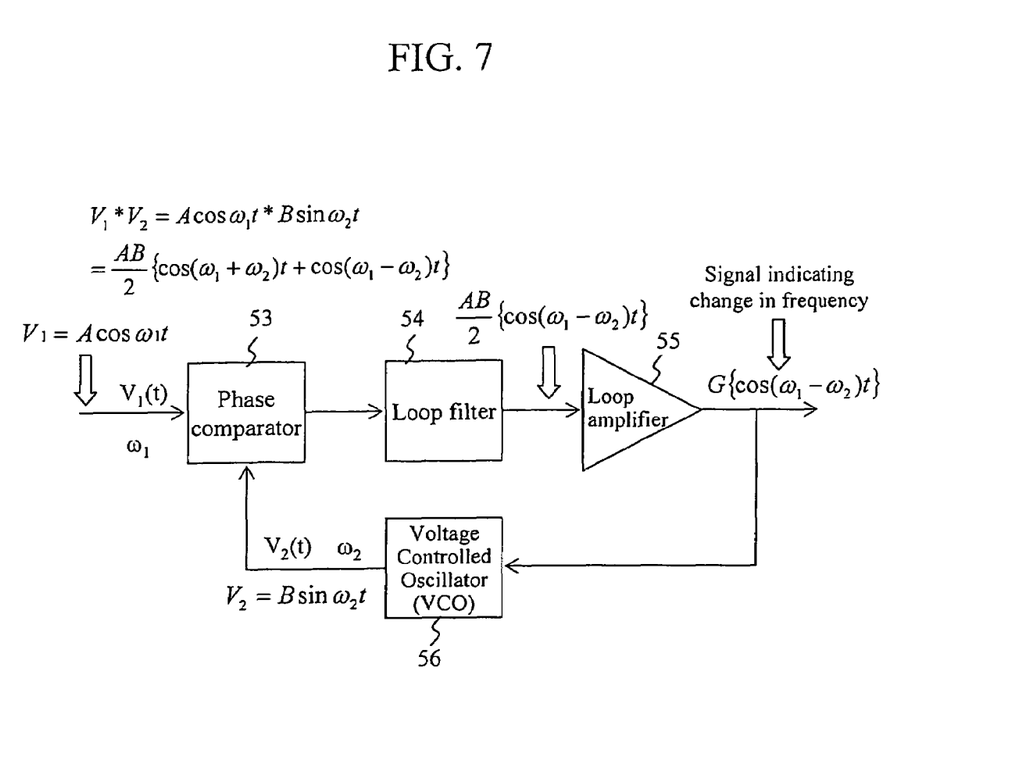
FIG. 7 is a block diagram of the PLL circuit.

Measurement of the atomic force gradient acting on the probe is described next utilizing the block diagram of PLL circuit shown in FIG. 7. While being vibrated, the probe is made to approach near the surface of the specimen 11. The exciter signal from the oscillator circuit 51 is input to the PLL circuit 50 at this time. The PLL circuit has a demodulation function, converts the resonance frequency into a low frequency signal, and inputs it to the servo circuit 35. In other words, the signal $V_1$ with the resonance frequency $\omega_1$ from oscillator circuit 51 equaling A cos $\omega_1$ t, is multiplied by the signal $V_2$ (B cos $\omega_2$t) with a frequency $\omega_2$ from the voltage controlled oscillator 56 at the phase comparator 53.

From the some component signals at the phase comparator 53, the loop filter 54 selects and outputs a signal containing a low frequency component of frequency ($\omega_1-\omega_2$), to the loop amplifier 55. The loop amplifier 55 outputs a signal G{cos($\omega_1-\omega_2$)t} showing the change in frequency. The voltage controlled oscillator 56 is regulated so that ($\omega_2=\omega_1$){cos ($\omega_1-\omega_2$)t}, (G=$\omega_1$) or in other words, so that $\omega_2$ always equals $\omega_1$.

Figure 8:
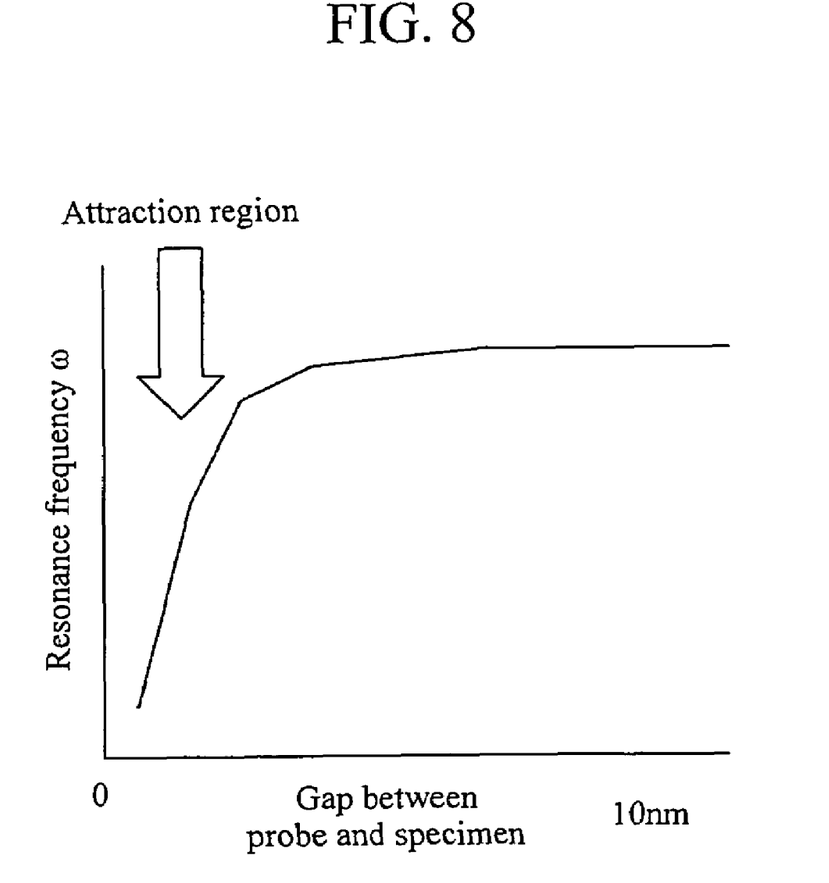
FIG. 8 is a graph showing the interrelation of the resonance frequency detected by the PLL circuit, and the distance between the specimen surface and probe.

When the probe near the specimen surface, the atomic force is applied to the probe, and the resonance point of the cantilever 22 is shifted. FIG. 8 shows the change in resonant frequency detected by the PLL circuit 50, as the probe approaches the specimen surface. The fluctuation in the force gradient is detected from this resonant frequency and when the amount of change in the force gradient reaches a preset amount, the probe is determined to have reached the surface of the specimen 11. The controller 37 thereupon promptly measures the surface position (x, y, z) of the specimen 11 from the probe position. The XY scanning function is completely stopped by the XY scanning circuit 25 at this time.

Instead of using an optical lever shown in the drawing for detecting the displacement of the probe, other measuring technology of the known art such as a capacity displacement meter, a strain gauge, or a light interferometer or similar device may be utilized.

Third Embodiment

Figure 9:
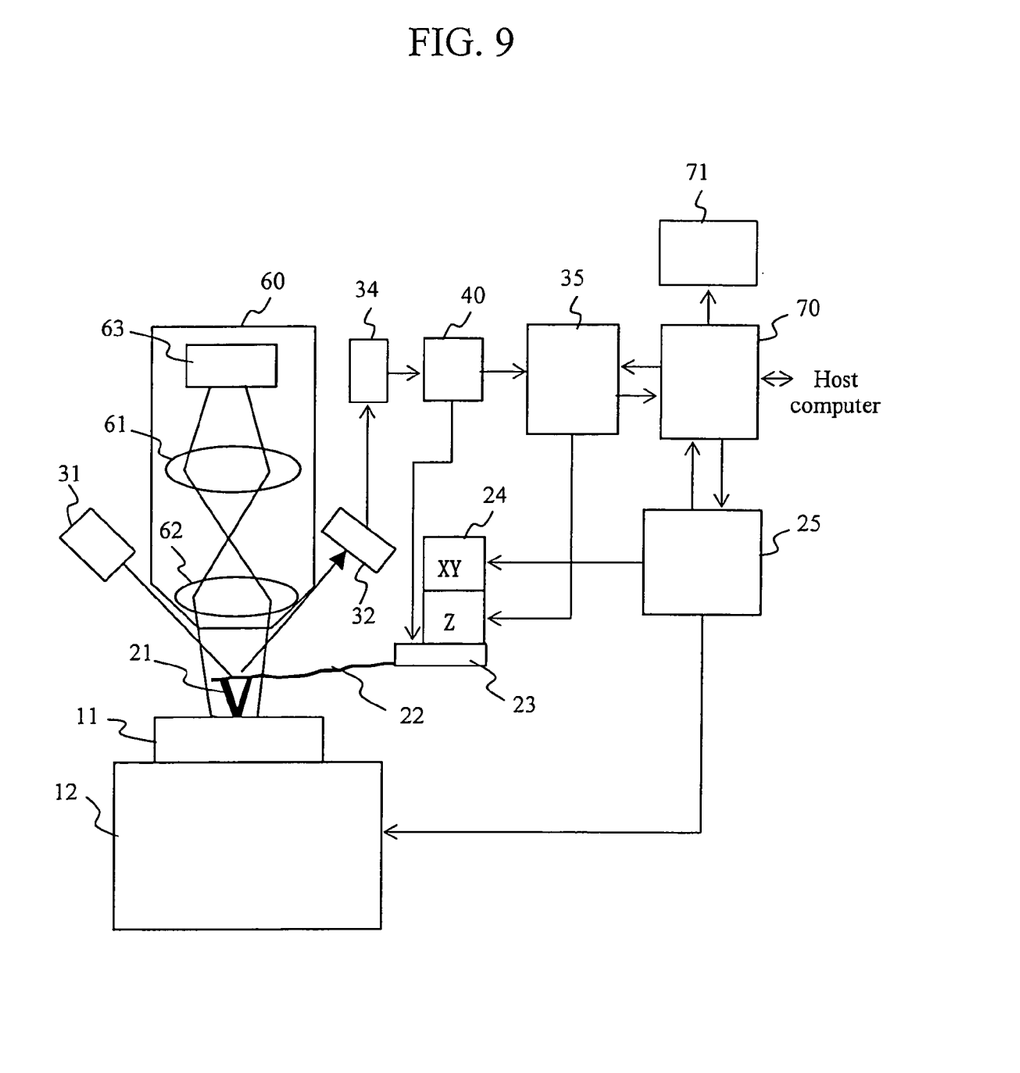
FIG. 9 is a concept block diagram of the semiconductor scanning device of the present invention.

FIG. 9 is a concept block diagram of a semiconductor scanning device utilizing a digital probing AFM incorporating the slope detection method. The semiconductor scanning device shown in the figure contains an AFM having a function using the vibration method for detecting the atomic force gradient. This device further contains a chip position detection function for measuring at an optional measurement position within the semiconductor chip, as well as a computer processing function for automatic measurements.

The force detector for the AFM utilizes the optical lever method. This force detector is made up of a semiconductor laser 31, a position detector 32, and a force detector 34. A lock-in amplifier 40 detects the force gradient the same as in the first embodiment. An approach device (not shown in drawing) is installed to make the probe 21 approach the surface of the specimen 11 (semiconductor chip).

In addition to the AFM measurement means, this embodiment further contains an optical microscope 60 for simultaneously observing the probe 21 and the specimen 11. The optical microscope 60 contains an objective lens 61 and an eyepiece lens 62. This optical microscope 60 is capable of simultaneously observing the specimen surface and cantilever 22 and the specimen 11. The epi-illumination system is omitted from the drawings. A CCD camera 63 observes the illuminated specimen 11 and the probe 2. The optical target captured by the CCD camera 63 is utilized to accurately recognize the chip position in the system. The chip placement on the wafer and the positional relationship within the inspection device are in this way calculated and found. Mapping in this way allows accurately determining the position of the probe 21 on locations on the chip whose surface shape was measured.

The controller 37 communicates (exchanges data) with the host computer and the wafer auto conveyor robot, receives measurement points and measurement conditions, controls automatic measurement and/or controls carry-in/carry-out of wafers from the robot. The controller 37 instructs the XY scanning circuit 25 to drive the specimen stage 12 and the XYZ scanning piezoelectric element 24 so that the location specified by the host computer becomes the observation position, and measures the specified location. The controller 37 communicates (transfers) the measurement data to the host computer and displays it on the display device 38.

The present invention as described above, when used to measure the shapes of high aspect structures with dimensions in the submicron range, is capable of making measurements down to the nanometer range and below without the probe slipping on the oblique surface. The present invention can further be utilized for defect (flaw) measurement and measuring dimensions of tiny devices. The present invention can also be utilized as a line monitor for semiconductor processes.

INDUSTRIAL APPLICABILITY

The present invention configured as described above, is capable of making measurements down to the nanometer range and below with no slipping of the probe on oblique surfaces in the measuring of shapes of high aspect structures with dimensions in the submicron range.

The invention claimed is:

1. A specimen surface structure measuring method for measuring a surface structure of a specimen utilizing a scanning probe microscope containing a probe attached on a cantilever, the method comprising the steps of:

stopping the servo control for maintaining a fixed gap between the probe and a specimen surface and moving the probe along the specimen surface to the measurement point with the probe separate from the specimen, moving the probe closer to the specimen surface while the probe is vibrated and measuring the probe position when a specified atomic force is detected in an atomic force region, and moving the probe away from the specimen surface immediately after the measurement, in which these steps are repeated at each measurement point.

2. A specimen surface structure measuring method according to claim 1, wherein in the step for moving the probe away from the specimen surface, the probe is moved at least to a distance where there is no absorption force to attract the probe.

3. A specimen surface structure measuring method according to claim 2, wherein a vibration frequency is a frequency shifted slightly from a cantilever resonance point, and the specified atomic force is detected based on a change in a vibration amplitude of the cantilever.

4. A specimen surface structure measuring method according to claim 2, wherein a vibration frequency is a frequency of a cantilever resonance point, and the specified atomic force is detected based on a shift in a cantilever resonance frequency.

5. A specimen surface structure measuring method according to claim 1, wherein a vibration frequency is a frequency shifted slightly from a cantilever resonance point, and the specified atomic force is detected based on a change in a vibration amplitude of the cantilever.

6. A specimen surface structure measuring method according to claim 1, wherein a vibration frequency is a frequency of a cantilever resonance point, and the specified atomic force is detected based on the shift in a cantilever resonance frequency.

7. A method for measuring the surface structure of a specimen using a scanning probe microscope comprising a cantilever to which a probe is fixed, the method comprising the steps of:

moving the probe to a position near the surface of the specimen;

moving the probe closer to the surface of the specimen while the probe is vibrated, and measuring the position of the probe upon detection of a predetermined atomic force in an attractive region; and moving the probe away from the surface of the specimen, in order to measure the three-dimensional surface position of a single pixel.

* * * * *